(12) United States Patent
Renner

(10) Patent No.: US 11,822,354 B1
(45) Date of Patent: Nov. 21, 2023

(54) PRESSURE REDUCER

(71) Applicant: HUSQVARNA AB, Huskvarna (SE)

(72) Inventor: Thomas Renner, Ulm (DE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 18/081,130

(22) Filed: Dec. 14, 2022

(30) Foreign Application Priority Data

Jun. 1, 2022 (EP) .................................. 22176754

(51) Int. Cl.
*G05D 16/06* (2006.01)

(52) U.S. Cl.
CPC ................................ *G05D 16/0641* (2013.01)

(58) Field of Classification Search
CPC ........... Y10T 137/781; Y10T 137/7811; Y10T 137/782; G05D 16/0641; G05D 16/063; G05D 16/0644; G05D 16/103
See application file for complete search history.

(56) References Cited

U.S. PATENT DOCUMENTS

| 614,441 A * | 11/1898 | Burnett ................ G05D 16/103 137/508 |
| 2,252,152 A | 8/1941 | Willy |
| 3,890,999 A * | 6/1975 | Moskow .............. G05D 16/103 137/484.4 |
| 4,543,985 A * | 10/1985 | Healy ................. G05D 16/0655 137/505.21 |
| 5,097,860 A | 3/1992 | Ferguson et al. |
| 5,396,918 A * | 3/1995 | Parker ................ G05D 16/0608 138/45 |
| 5,875,815 A * | 3/1999 | Ungerecht ......... G05D 16/0658 137/508 |
| 9,971,361 B2 | 5/2018 | Greenwood et al. |
| 10,416,689 B2 * | 9/2019 | Greenwood ....... G05D 16/0636 |

(Continued)

FOREIGN PATENT DOCUMENTS

| CN | 204512569 U | 7/2015 |
| DE | 4015776 A1 | 11/1990 |

(Continued)

*Primary Examiner* — Jessica Cahill
(74) *Attorney, Agent, or Firm* — BURR & FORMAN LLP

(57) ABSTRACT

A pressure reducer (100) for reducing a fluid pressure includes a pressure reducer body (110) defining at least one pressure reducer chamber (120). The pressure reducer chamber (120) includes an inlet section (122) and an outlet section (124) fluidly coupled with the inlet section (122). The pressure reducer chamber (120) further includes a spring-operated piston rod (121) and a sealing element (128) operatively coupled with the piston rod (121). A flange (132) is sealing coupled with the pressure reducer body (110). The pressure reducer body (110) defines a pressure compensation hole (114). The pressure reducer (100) is characterized in that the pressure reducer body (110) has a first threaded portion (112), and the flange (132) has a second threaded portion (134) such that the pressure reducer body (110) and the flange (132) are threadedly coupled. The pressure compensation hole (114) is disposed in the first threaded portion (112) of the pressure reducer body (110) such that the flange (132) is adapted to enclose the pressure compensation hole (114) when the flange (132) is coupled to the pressure reducer body (110).

10 Claims, 3 Drawing Sheets

(56) References Cited

U.S. PATENT DOCUMENTS

2003/0221726 A1* 12/2003 Semeia ................ G05D 16/103
                                                      137/338
2017/0108879 A1* 4/2017 Takeda ................... G05D 7/014
2019/0317534 A1* 10/2019 Nelson ................ G05D 16/187

FOREIGN PATENT DOCUMENTS

| DE | 112005003291 T5 | 3/2008 |
| DE | 102006021926 B4 | 12/2011 |
| EP | 678798 B1 | 12/1998 |
| EP | 2325715 A2 | 5/2011 |
| EP | 2191178 B1 | 11/2012 |
| EP | 2376991 B1 | 1/2017 |
| FR | 1555748 A | 1/1969 |
| WO | 9830859 A1 | 7/1998 |
| WO | 2012157398 A1 | 11/2012 |
| WO | 2018081111 A1 | 5/2018 |

* cited by examiner

PRESSURE REDUCER

TECHNICAL FIELD

The present disclosure relates to a pressure reducer. More specifically, the present disclosure relates to an efficient working of the pressure reducer without any hinderance from dirt, or other unwanted foreign elements.

BACKGROUND

Pressure reducers are found in many common domestic and industrial applications. For example, pressure reducers are used in gas grills to regulate propane, in home heating furnaces to regulate natural gases, in medical and dental equipment to regulate oxygen and anesthesia gases, in pneumatic automation systems to regulate compressed air, in engines to regulate fuel and in gardening systems to regulate irrigation among other applications. As this partial list demonstrates there are numerous applications for pressure reducers yet, in each of them, the pressure reducers provide the same function. The pressure reducers reduce a supply (or inlet) pressure to a lower outlet pressure and work to maintain this outlet pressure despite fluctuations in the inlet pressure. The reduction of the inlet pressure to the lower outlet pressure is the key characteristic of the pressure reducers.

The pressure reducer includes a spring-operated piston rod and a diaphragm operatively coupled with the piston rod in a pressure reducer chamber. For smooth working of the piston rod and the diaphragm, the pressure reducer further includes a pressure compensation hole. The pressure compensation hole ensures mobility of the piston rod and the diaphragm in the axial direction of the pressure reducer. In the known pressure reducers, the pressure compensation hole is exposed to the surrounding environment and may thus be clogged with dirt, sand, or any other foreign element and impair functional safety of the pressure reducer by limiting the mobility of the piston rod and the diaphragm due to under pressure or over pressure caused in the pressure reducer chamber. Hence, an improved pressure reducer is required that may at least partially prevent the pressure compensation hole from direct exposure to the surrounding environment of the pressure reducer.

An example of a pressure reducer is provided in Chinese utility model 204,512,569 (hereinafter referred to as '569 reference). The '569 reference provides a filter pressure reducer that includes a pressure reducer and a filter equipment. The pressure reducer includes a main part, a regulator, and a valve cap. The valve cap outer wall is equipped with a strengthening rib and a pressure regulating hole, the inside of which is equipped with the filter screen. However, there is still a need for a simple and improved pressure reducer that may prevent clogging of the pressure compensation hole without requiring any additional attachment such as the filter screen.

SUMMARY

In view of the above, it is an objective of the present invention to solve or at least reduce the drawbacks discussed above. The objective is at least partially achieved by a pressure reducer for reducing a fluid pressure. The pressure reducer includes a pressure reducer body defining at least one pressure reducer chamber. The pressure reducer chamber includes an inlet section and an outlet section fluidly coupled with the inlet section such that the inlet section and the outlet section allow inlet and outlet of the fluid respectively. The pressure reducer chamber further includes a spring-operated piston rod and a sealing element operatively coupled with the piston rod. A flange is sealingly coupled with the pressure reducer body such that the sealing disallows the backflow of fluid past the outlet section. The pressure reducer body further defines a pressure compensation hole. The pressure reducer is characterized in that the pressure reducer body has a first threaded portion, and the flange has a second threaded portion complimentary to the first threaded portion such that the pressure reducer body and the flange are threadedly coupled to each other through the first and the second threaded portion. The pressure compensation hole is disposed in the first threaded portion of the pressure reducer body such that the flange is adapted to enclose the pressure compensation hole when the flange is coupled to the pressure reducer body.

Thus, the present disclosure provides an improved pressure reducer that is simple in construction and easy to install. The pressure reducer is advantageously designed in a manner such that the pressure compensation hole is not directly exposed to an external environment. The pressure compensation hole is enclosed or covered by the flange, which thereby provides protection to the pressure compensation hole against foreign elements present in the surroundings or the external environment of the pressure reducer. The flange prevents clogging of the pressure compensation hole due to dirt, sand, etc. The pressure compensation hole, thereby allows or ensures unobstructed mobility of the piston rodin the pressure reducer chamber and hence the efficient working of the pressure reducer.

According to an embodiment of the present disclosure, the pressure compensation hole is located proximate to the first threaded portion of the pressure reducer body such that the flange encloses the pressure compensation hole. The pressure compensation hole is disposed in the first threaded portion of the pressure reducer body or proximate to the first threaded portion of the pressure reducer body depending on the factors such as, but not limited to, application requirements, construction feasibility, among others. However, irrespective of the location of the pressure compensation hole such as in or proximate to the first threaded portion, the pressure compensation hole is always covered by the flange to substantially prevent clogging of the pressure compensation hole.

According to an embodiment of the present disclosure, the pressure compensation hole is a circular hole. The hole is preferably circular as it is easy to drill a circular hole. Further, it substantially prevents material wastage when compared with manufacturing or producing holes of other shapes. However, the hole may have any other suitable shape without restricting the scope of the present disclosure. In some embodiments of the present disclosure, the pressure compensation hole is a channel extending at least partially along a length of the first threaded portion of the pressure reducer body. The channel provides relatively more area for fluid ventilation during the working of the pressure reducer. Thus, even if the channel is partially clogged due to unforeseen or uncontrollable external factors or interferences, the fluid ventilation may still be enough to promote unhindered working of the pressure reducer.

According to an embodiment of the present disclosure, the threaded coupling between the pressure reducer body and the flange acts as a filter body for the fluid drawn-in via the pressure compensation hole. The pressure reducer body has the first threaded portion, and the flange has the second threaded portion complimentary to the first threaded portion.

The first threaded portion and the second threaded portion in addition to allowing coupling between the pressure reducer body and the flange, further functions as the filter body for the fluid drawn-in via the compensation hole during the suction stroke of the piston rod in the pressure reducer chamber of the pressure reducer. The first and the second threaded portion substantially prevents the ingress of foreign elements such as dirt, sand, etc. inside the pressure reducer chamber. Thus, there is no requirement of an additional element or a separate component in the form of the filter and thereby there is no additional cost incurred in the manufacturing and installation of the pressure reducer.

According to an embodiment of the present disclosure, the sealing element seals the coupling between the flange and the pressure reducer body. The boundaries or the extremities of the sealing element are abutted or pressed between the flange and the pressure reducer body, thereby providing fluid-tight sealing. The fluid tight sealing is the outcome of the contact pressure exerted on the sealing element due to the coupling between the flange and the pressure reducer body. The sealing disallows the backflow of fluid past the outlet section, thereby eliminating any possible leakage and improving the overall efficiency of the pressure reducer.

According to an embodiment of the present disclosure, the sealing element is a diaphragm. The diaphragm communicates an excess fluid pressure at the outlet section to the piston rod for downward stroke of the piston rod. Further, the diaphragm allows the sealing of the coupling between the flange and the pressure reducer body. The multiple usage or application of the diaphragm means no separate sealing elements such as O-rings are required for the sealing. Hence, the pressure reducer is easy to assemble with all its necessary components or accessories with further advantage of lower manufacturing expenses due to less components or material required for the assembly or manufacturing of the pressure reducer. Further, due to less components, maintenance costs of the pressure reducer is also reduced. Furthermore, the sealing may prevent ingress of air in the outlet section, thereby preventing mixing of air drawn-in from the compensation hole with the fluid (say liquid).

According to an embodiment of the present disclosure, the pressure reducer generates a constant output pressure of 4 bars. Further, in some embodiments, the pressure reducer generates a constant output pressure of 1.5 bars. The constant output pressure may be pre-determined and preset during the manufacturing of the pressure reducer according to the application requirements of the pressure reducer. For example, the constant output pressure of 1.5 bars is well suited and optimal for the operation of drip heads and spray nozzles used for gardening operations.

According to an embodiment of the present disclosure, a valve selectively allows and disallows passage of fluid via the inlet section. The valve selectively allows the passage of fluid to the outlet section such as to maintain a constant output pressure of the pressure reducer. The piston rod oscillates to momentarily block the supply of fluid from the inlet section towards the outlet section.

According to an embodiment of the present disclosure, the pressure reducer is used for drip-irrigation. The pressure reducer of the present disclosure finds its application with the gardening operations such as, but not limited to, drip-irrigation. However, the pressure reducer of the present disclosure is not restricted with its application area. The pressure reducer may conveniently and efficiently be used for any domestic or industrial application.

Other features and aspects of this invention will be apparent from the following description and the accompanying drawings.

BRIEF DESCRIPTION OF THE DRAWINGS

The invention will be described in more detail with reference to the enclosed drawings, wherein.

DESCRIPTION OF EMBODIMENTS

Figure 1:
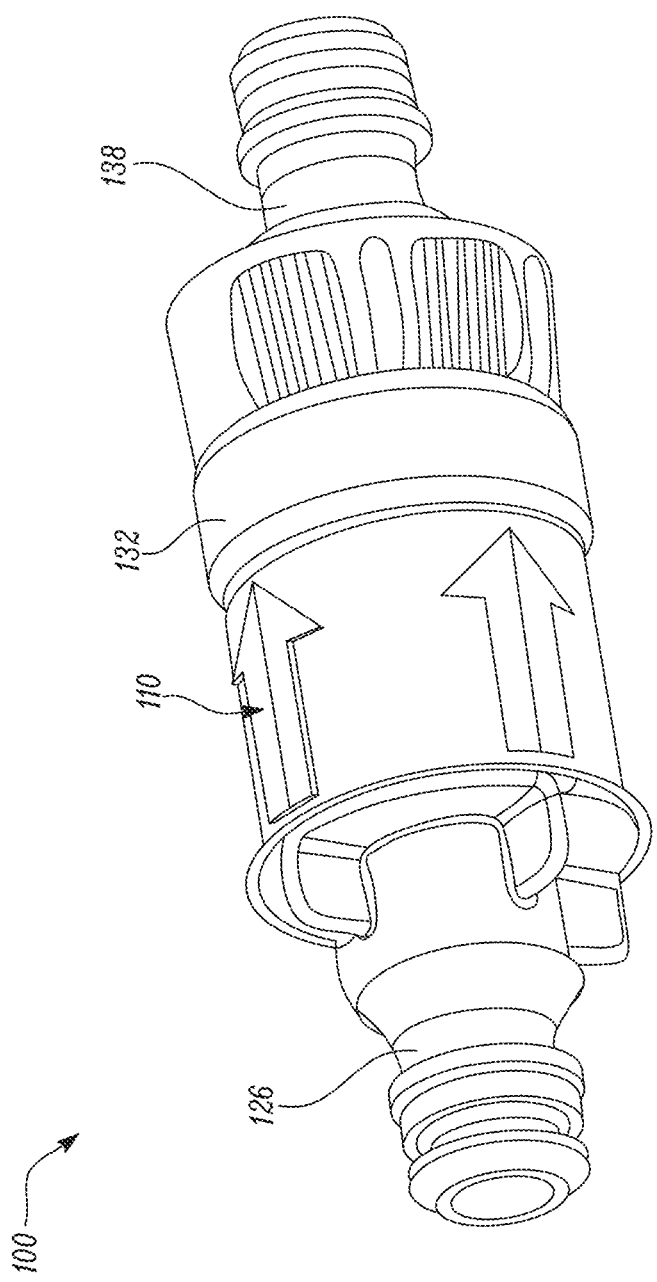
FIG. 1 shows a perspective view of a pressure reducer assembly, in accordance with an aspect of the present disclosure.

The present invention will be described more fully hereinafter with reference to the accompanying drawings, in which example embodiments of the invention incorporating one or more aspects of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, one or more aspects of the present invention may be utilized in other embodiments and even other types of structures and/or methods. In the drawings, like numbers refer to like elements.

Certain terminology is used herein for convenience only and is not to be taken as a limitation on the invention. For example, "upper", "lower", "front", "rear", "side", "longitudinal", "lateral", "transverse", "upwards", "downwards", "forward", "backward", "sideward", "left," "right," "horizontal," "vertical," "upward", "inner", "outer", "inward", "outward", "top", "bottom", "higher", "above", "below", "central", "middle", "intermediate", "between", "end", "adjacent", "proximate", "near", "distal", "remote", "radial", "circumferential", or the like, merely describe the configuration shown in the Figures. Indeed, the components may be oriented in any direction and the terminology, therefore, should be understood as encompassing such variations unless specified otherwise.

FIG. 1 illustrates a pressure reducer 100. The pressure reducer 100 of the present disclosure is used for reducing a fluid pressure of the fluid intended to be used for drip-irrigation or other gardening operations. However, the pressure reducer 100 of the present disclosure is not restricted with its application area. The pressure reducer 100 may conveniently and efficiently be used for any other domestic or industrial applications.

Further, the fluid used with the pressure reducer 100 may be a liquid (say water) or a gas (say air) depending on the application requirement of the pressure reducer 100. The fluid may selectively be provided by a fluid source (not shown) at a pressure equal to more than the output pressure requirements of the application for which the pressure reducer 100 is used.

The fluid source may advantageously be provided with a valve such as to regulate the outflow of the fluid from the fluid source. Further, the fluid source may be provided with an automatic operatable accessory that may automatically regulate the outflow of the fluid from the fluid source. For example, the fluid source may be provided with a watering computer when the fluid is a water. The watering computer may allow and regulate outflow of the water from the fluid source (or water source) depending upon the time of the day, preset water outflow timings, among other factors.

The fluid source may be fluidly coupled to the pressure reducer 100 via a hose or any other means commonly known and understood in the related art without limiting the scope of the present disclosure. In some embodiments, the fluid source may be fluidly coupled to a plurality of pressure reducers 100 by way of fluid distributors (commonly available in the related art).

Figure 2:
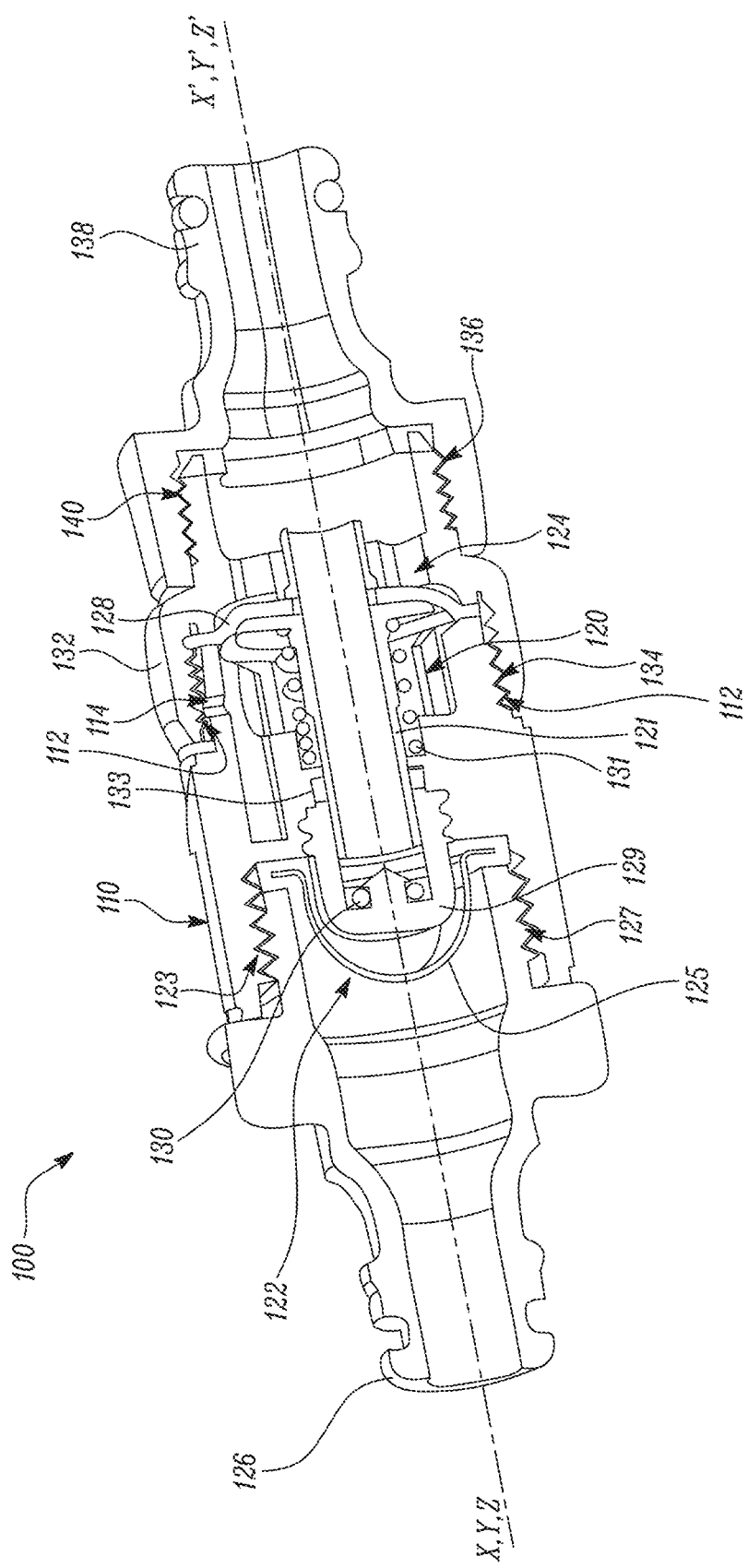
FIG. 2 shows a cross-section view of a pressure reducer assembly, in accordance with an aspect of the present disclosure.

The pressure reducer 100, as illustrated in FIGS. 1 and 2, includes a pressure reducer body 110. The pressure reducer body 110 of the present disclosure is a cylindrical body having a central axis X-X' along a longitudinal direction of the pressure reducer 100. However, in actual implementation of the present disclosure, the pressure reducer body 110 may have any other shape without restricting the scope of the present disclosure. The pressure reducer body 110 may be made of brass, plastic, and aluminum. Various grades of stainless steel (such as 303, 304, and 316) may also be used for the manufacture of the pressure reducer body 110. However, any other material available to handle various fluids and operating environments may be employed for making or manufacturing the pressure reducer body 110. Further, any suitable manufacturing process may be employed for manufacturing of the pressure reducer body 110 without restricting the scope of the present disclosure.

The pressure reducer body 110 defines at least one pressure reducer chamber 120. The pressure reducer chamber 120 includes an inlet section 122 and an outlet section 124 fluidly coupled with the inlet section 122 such that the inlet section 122 and the outlet section 124 allow inlet and outlet of the fluid respectively. The inlet section 122 is defined along a central axis Y-Y' and the outlet section 124 is defined along a central axis Z-Z'. In some embodiments, as shown in FIG. 2, the central axes Y-Y', Z-Z' and X-X' coincide with each other along the longitudinal direction of the pressure reducer 100. In some embodiments, the central axes Y-Y', Z-Z' and X-X' may be parallel to each other but may not necessarily coincide with each other. In some embodiments, the central axes Y-Y', Z-Z' and the X-X' may have any other angular orientation with respect to each other or with respect to the longitudinal direction of the pressure reducer 100 without restricting the scope of the present disclosure in any manner.

The inlet section 122 is fluidly coupled to the fluid source via a coupling nipple 126, as shown in FIGS. 1 and 2. The coupling nipple 126 may advantageously be designed in a manner such that the coupling nipple 126 selectively allows passage of fluid therethrough (received from the fluid source) only when it is fluidly coupled with the inlet section 122 of the pressure reducer 100. Such a design of the coupling nipple 126 may substantially prevent fluid leakages when the pressure reducer 100 is not operational or not in use. In some embodiments, the inlet section 122 may be sealingly coupled to the coupling nipple 126. The sealing may be provided by a sealing gasket, O-ring, or any other known and easily available sealing means (or sealing element).

The inlet section 122 further includes a threaded portion 123 such that the threaded portion 123 threadedly engages with a complimentary threaded portion 127 of the coupling nipple 126. Thus, in the preferred embodiment of the present disclosure, the inlet section 122, and the coupling nipple 126 are threadedly engaged or coupled with each other. However, in actual implementation of the present disclosure, the fluid coupling between the inlet section 122 and the coupling nipple 126 may be accomplished by any suitable means known and understood in the related art.

In the preferred embodiment of the present disclosure, as illustrated in FIG. 2, the inlet section 122 further includes a filter element 125. The filter element 125 may be operatively coupled to the inlet section 122 such that the filter element 125 filters the fluid received from the fluid source before it enters the pressure reducer chamber 120. The filter element 125 prevents clogging of the inlet section 122 and thereby promotes smooth operations of the pressure reducer 100. The filter element 125 may be coupled to the inlet section 122 by any means known in the related art. For example, the filter element 125 may be glued to the inlet section.

Further, the filter element 125 may have any shape, size, and type as per the application requirements. In some embodiments, the filter element 125 may be a surface filter made of closely woven fabric or treated paper with a uniform pore size. Fluid from the fluid source flows through the pores of the filter element 125 and contaminants are stropped on the filter element surface. In some embodiments, the filter element 125 may be a depth filter made of layers of fabric or fibers, which provide many tortuous paths for the fluid to flow through. The pores or passages are larger than the rated size of the filter element 125 for particles to be retained in the depth of the media rather than on the surface. In some embodiments, the filter element 125 may be of the 5-micron, woven mesh, micronic, porous metal, or magnetic type. The micronic and 5-micron elements have non-cleanable filter media and may be disposed of when they are removed whereas the porous metal, woven mesh and magnetic filter elements are designed to be cleaned and reused.

Further, as illustrated in FIG. 2, the inlet section 122 includes a valve 129. The valve 129 selectively allows the fluid from the fluid source to pass through the pressure reducer chamber 120. The valve 129 selectively allows and disallows passage of fluid via the inlet section 122. The valve 129 selectively allows the passage of fluid to the outlet section 124 such as to maintain constant output pressure of the pressure reducer 100. The valve 129 is located downstream of the filter element 125 in the direction of the fluid flow. The valve 129 may be coupled to the inlet section 122 by any suitable means known in the art. However, in the preferred embodiment, the valve 129 is screwed into the inlet section 122. The screw coupling between the valve 129 and the inlet section 122 allows for movement of the valve 129 relative to the inlet section along the longitudinal direction of the pressure reducer 100. The movement of the valve 129 along the longitudinal direction of the pressure reducer 100 may also help in adjusting the constant output pressure generated by the pressure reducer 100.

In some embodiments, the valve 129 may be along the central axis X-X' of the pressure reducer body 110. In some embodiments, the valve 129 may be along the central axis Y-Y' of the inlet section 122. In some embodiments, the valve 129 may be parallel to the central axis X-X' of the pressure reducer body 110. In some embodiments, the valve 129 may be offset to the central axis X-X' of the pressure reducer body 110. In some embodiments, the valve 129 may be at an angle to the central axis X-X' of the pressure reducer body 110. In some embodiments, the valve 129 may be parallel to the central axis Y-Y' of the inlet section 122. In some embodiments, the valve 129 may be offset to the central axis Y-Y' of the inlet section 122. In some embodiments, the valve 129 may be at an angle to the central axis Y-Y' of the inlet section 122. The valve 129 may have orientation relative to the longitudinal direction of the pressure reducer 100 without restricting the scope of the present disclosure in any manner.

The valve 129 further includes a seal 130. The seal 130 may be O-ring or any other type of seal generally available in the related art. In some embodiments, the seal 130 may be a flat seal. In some embodiments, the seal 130 may be a radial seal, i.e., providing sealing of the fluid in the radial direction.

With continued reference to FIG. 2, the pressure reducer chamber 120 further includes a spring-operated piston rod 121. The piston rod 121 is a hollow rod allowing passage of the fluid of which the pressure is to be reduced in the pressure reducer 100. The spring 131 may be compression spring or any other known type of spring commonly used to operate the piston rod 121. In some embodiments, the spring 131 may wrap along the outer peripheral surface of the piston rod 121. In some embodiments, the spring 131 may be a plurality of springs 131 equidistantly positioned along the outer peripheral surface of the piston rod 121 such that the plurality of springs 131 are oriented along the longitudinal direction of the pressure reducer 100. The spring 131 may have strength enough to operate the piston rod 121. The spring 131 may have length enough to generate strength to operate the piston rod 121. The spring 131 may not have strength more than what is required to operate the piston rod 121 as the greater strength of the spring 131 leads to greater installation space of the spring 131 and thus an unnecessary increase in size of the pressure reducer 100.

Further, the piston rod 121 may be concentric with the pressure reducer body 110 or the pressure reducer chamber 120. In some embodiments, the piston 121 may have any other orientation relative to the earlier defined central axes X-X', Y-Y' and Z-Z' in accordance with the operational feasibility of the pressure reducer 100. The piston rod 121 of the present disclosure is configured to oscillate back and forth substantially within the pressure reducer chamber 120. The back-and-forth motion of the piston rod 121 is due to differential force experienced by the piston rod 121. The piston rod 121 is forced to exhibit a downward stroke i.e. towards the inlet section 122 when the pressure at the outlet section 124 is more than required for the application for which the pressure reducer 100 is intended for use. Further, the piston rod 121 exhibits an upward stroke i.e. towards the outlet section 124 when the pressure at the outlet section 124 is equal to pressure required for the application for which the pressure reducer 100 is intended for use.

The fluid in the outlet section 124 is prevented from leaking back to the pressure reducer chamber 120 by a sealing element 128 operatively coupled with the piston rod 121 in the pressure reducer chamber 120. The sealing element 128 may be a lip seal, an O-ring, or any other known type of the sealing element 128 known and understood in the related art. However, in the preferred embodiment of the present disclosure, the sealing element 128 is a diaphragm 128. The diaphragm 128 communicates an excess fluid pressure at the outlet section 124 to the piston rod 121 for downward stroke of the piston rod 121. Further, for rest of the disclosure, the sealing element 128 will be treated as the diaphragm 128.

Referring to the differential force experienced by the piston rod 121. The force experienced by the piston rod 121 is due to the spring 131 and the diaphragm 128 operatively coupled with the piston rod 121 in the pressure reducer chamber 120. The direction of motion of the piston rod 121 at any particular time instant is governed by the direction of net force generated upon the piston rod 121 by the spring 131 and the diaphragm 128. For example, the piston rod 121 moves in upstream direction when the net force is in upstream direction due to higher magnitude of force generated by the diaphragm 128 relative to the force generated by the spring 131.

The constant output pressure generated by the pressure reducer 100 may be adjusted by varying the initial distance or the gap between the piston rod 121 and the seal 130 during the manufacturing of the pressure reducer 100. For example, the constant output pressure may be pre-determined and preset during the manufacturing of the pressure reducer according to the application requirements of the pressure reducer 100. Some applications may demand the constant output pressure of 4 bars while other applications such as drip heads and spray nozzles used for gardening operations may demand the constant output pressure of 1.5 bars. Accordingly, the initial distance or the gap between the piston rod 121 and the seal 130 is increased for generating constant output pressure of 4 bars while it is comparatively reduced for generating constant output pressure of 1.5 bars.

Figure 3:
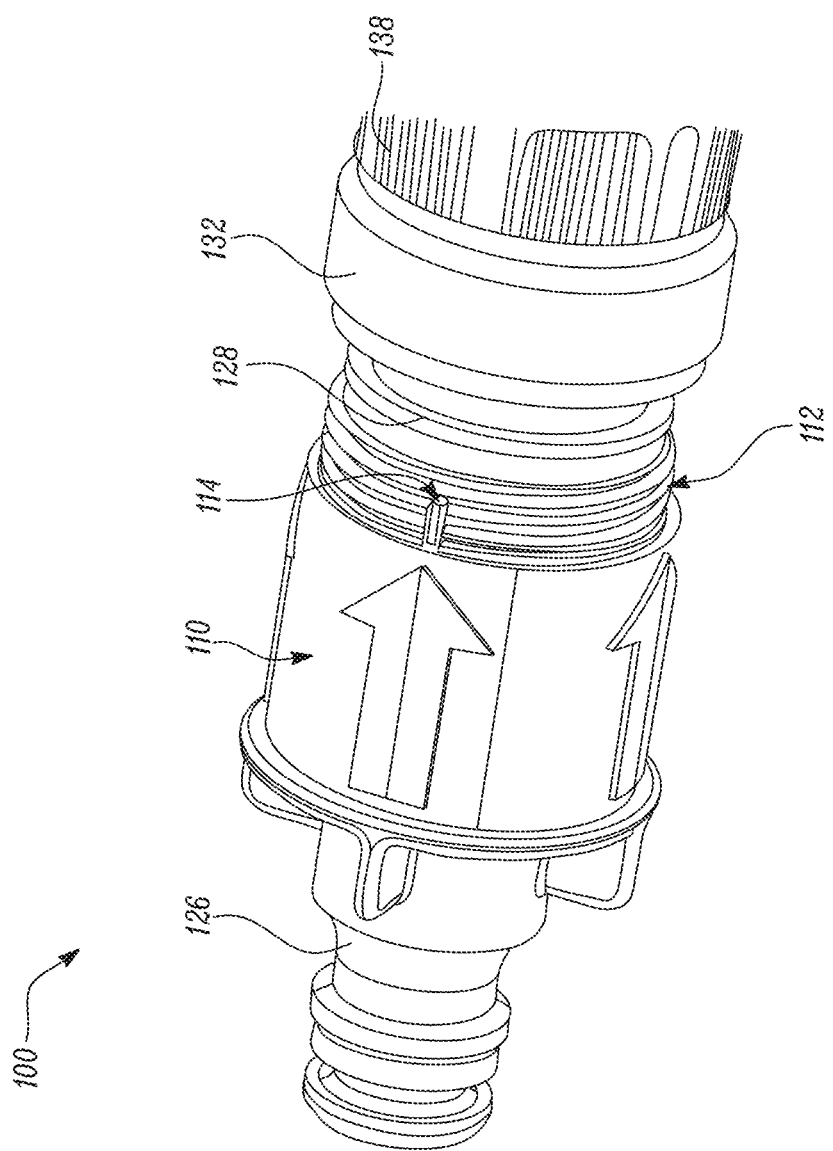
FIG. 3 shows another perspective view of a pressure reducer assembly, in accordance with an aspect of the present disclosure.

With continued reference to FIG. 2 and with further reference to FIG. 3, the pressure reducer body 110 includes a first threaded portion 112 on its outside surface facing opposite to the pressure reducer chamber 120. The first threaded portion 112 may be used for coupling the pressure reducer body 110 with other accessories of the pressure reducer 100. The pressure reducer body 110 further includes a pressure compensation hole 114 in the first threaded portion 112. The pressure compensation hole 114 ensures unrestricted mobility of the piston rod 121. The pressure compensation hole 114 allows release of air pressure generated in the pressure reducer chamber 120 when the piston rod 121 moves in the upstream direction of the fluid flow in the pressure reducer 100. The pressure compensation hole 114 allows air to escape from the pressure reducer chamber 120 when the piston rod 121 moves in the upstream direction of the fluid flow in the pressure reducer 100. Conversely, the pressure compensation hole 114 allows suction of the surrounding air (external to the pressure reducer 100) when the piston rod 121 moves in the downstream direction of the fluid flow in the pressure reducer 100.

In some embodiments, the pressure compensation hole 114 may be located proximate to the first threaded portion 112 of the pressure reducer body 110. In some embodiments, the pressure compensation hole 114 is a circular hole. The hole is preferably circular as it is easy to drill a circular hole. Further, it substantially prevents material wastage when compared with manufacturing or producing holes of other shapes. However, the hole may have any other suitable shape without restricting the scope of the present disclosure.

In some embodiments of the present disclosure, the pressure compensation hole 114 may be a channel extending at least partially along a length of the first threaded portion 112 of the pressure reducer body 110. The channel provides relatively more area for fluid ventilation during the working of the pressure reducer 100. Thus, even if the channel is partially clogged due to unforeseen or uncontrollable external factors or interferences, the fluid ventilation may still be enough to promote unhindered working of the pressure reducer 100. Further, the channel may be straight channel, zig-zag channel, or the channel with any other configuration without limiting the scope of the present disclosure.

In some embodiments, air in the pressure reducer chamber 120 surrounding the spring-operated piston rod 121 is sealed from the valve 129 using a sealing element 133. The sealing element 133 prevents mixing of air in the pressure reducer chamber 120 with the fluid introduce in the pressure reducer 100 via the inlet section 122. The sealing element 133 may be O-ring or any other commonly available sealing element known in the art without restricting the scope of the present disclosure.

With reference to FIGS. 1, 2 and 3, a flange 132 is sealingly coupled with the pressure reducer body 110 such that the sealing disallows the backflow of fluid past the outlet section 124. The flange 132 is concentric with the pressure reducer body 110. The diaphragm 128 (alternatively, the sealing element 128) seals the coupling between the flange 132 and the pressure reducer body 110. The boundaries or the extremities of the diaphragm 128 are abutted or pressed between the flange 132 and the pressure reducer body 110, thereby providing a fluid-tight sealing. The fluid tight sealing is the outcome of the contact pressure exerted on the diaphragm 128 due to the coupling between the flange 132 and the pressure reducer body 110.

The sealing prevents or disallows the backflow of fluid past the outlet section 124, thereby eliminating any possible leakage and improving the overall efficiency of the pressure reducer 100. Further, the multiple usage or application of the diaphragm 128 means no separate sealing elements such as O-rings are required for the sealing. Hence, the pressure reducer 100 is easy to assemble with all its necessary components or accessories with further advantage of lower manufacturing expenses due to less components or material required for the assembly or manufacturing of the pressure reducer 100. Further, due to less components, pressure reducer maintenance cost is also reduced. Furthermore, the sealing may prevent ingress of air in the outlet section 124, thereby preventing mixing of air drawn-in from the compensation hole with the fluid (say liquid).

The flange 132 has a second threaded portion 134 complimentary to the first threaded portion 112 such that the pressure reducer body 110 and the flange 132 are threadedly coupled to each other through the first and the second threaded portion 112, 134. The pressure compensation hole 114 is disposed in the first threaded portion 112 of the pressure reducer body 110 such that the flange 132 is adapted to enclose the pressure compensation hole 114 when the flange 132 is coupled to the pressure reducer body 110.

The pressure compensation hole 114 is disposed in the first threaded portion 112 of the pressure reducer body 110 or proximate to the first threaded portion 112 of the pressure reducer body 110 depending on the factors such as, but not limited to, application requirement, construction feasibility, among others. However, irrespective of the location of the pressure compensation hole 114 such as in or proximate to the first threaded portion 112, the pressure compensation hole 114 is always covered by the flange 132 to substantially prevent clogging of the pressure compensation hole 114. Thus, the pressure compensation hole 114 is always operational to remove or draw-in air from or to the pressure reducer chamber 120 when the piston rod 121 moves in the upstream and downstream direction respectively.

In some embodiments, the pressure compensation hole 114 may additionally be disposed in the second threaded portion 134 of the flange 132. In some embodiments, there may be more than one pressure compensation hole 114 in the pressure reducer body 110 such that the pressure compensation holes 114 are covered or enclosed by the flange 132.

With continued reference to FIG. 2, the threaded coupling between the pressure reducer body 110 and the flange 132 acts as a filter body for the fluid drawn-in via the compensation hole 114. The pressure reducer body 110 has the first threaded portion 112, and the flange 132 has the second threaded portion 134 complimentary to the first threaded portion 112. The first threaded portion 112 and the second threaded portion 134 in addition to allowing coupling between the pressure reducer body 110 and the flange 132, further functions as the filter body for the fluid drawn-in via the pressure compensation hole 114 during the suction stroke of the piston rod 121 (movement of the piston rod 121 downstream) in the pressure reducer chamber 120 of the pressure reducer 100.

The first and the second threaded portions 112, 134 substantially prevent the ingress of foreign elements such as dirt, sand, etc. inside the pressure reducer chamber 120 or in the pressure compensation hole 114 thereby preventing any potential clogging of the pressure compensation hole 114. Thus, there is no requirement of an additional element or a separate component in the form of the filter and thereby there is no additional cost incurred in the manufacturing and installation of the pressure reducer 100.

The flange 132 further includes a third threaded portion 136. The third threaded portion 136 is formed on an outer surface of the flange 132 contrary to the second threaded portion 134, which is formed on an inner surface of the flange 132. The third threaded portion 136 faces the pressure reducer body 110 while the second threaded portion 134, faces away from the pressure reducer body 110 in an opposite direction.

The second threaded portion 134 couples the flange 132 with the pressure reducer body 110 whereas the third threaded portion 136 couples the flange 132 with a connector 138 (or a nipple 138). The connector 138 may complete the pressure reducer assembly and may allow the fluid with the reduced pressure to be transported for various domestic and industrial applications. The coupling between the flange 132 and the connector 138 is a threaded coupling due to threaded engagement of the third threaded portion 136 and a threaded portion 140 of the connector 138. However, in some embodiments, the coupling between the flange 132 and the connector 138 may be due to any other coupling means known and understood in the related art.

In operation, the fluid from the fluid source enters the pressure reducer 100 at high pressure from the inlet section 122. The fluid is filtered using filter element 125 before it reaches the valve 129. The valve 129 selectively allows the passage of the fluid towards the spring-operated hollow piston rod 121. The fluid from the piston rod 121 flows outwards towards the flange 132 and finally towards the connector 138 for use with various domestic and industrial applications.

The pressure of the high-pressure fluid from the fluid source is reduced by the oscillating motion of the piston rod 121 substantially within the pressure reducer chamber 120. The piston rod 121 oscillates to reduce the fluid pressure to the constant output pressure. The piston rod 121 momentarily block the supply of fluid from the inlet section 122 towards the outlet section 124. The piston rod 121 blocks the supply of fluid by engagement with the seal 130 of the valve 129. The seal 130 may axially or radially seals the piston rod 121 to prevent the fluid from entering the piston rod 121.

The piston rod 121 momentarily blocks the supply of fluid from the inlet section 122 when it is pressed by the diaphragm 128 against the spring force towards the upstream direction of the fluid flow. Further, the fluid may also lose some energy when the fluid presses the diaphragm 128 such that diaphragm further presses the piston rod 121 to make it move towards the upstream direction of the fluid flow. This way, the high fluid pressure is reduced to the final output pressure.

Further, when the fluid pressure near the output section 124 is reduced to the final value, the spring 131 may overcome the force of the diaphragm 128 such that the piston rod 121 moves in the downstream direction towards its original position. The oscillating movement of the piston rod 121 is assisted by the pressure compensation hole 114 as already discussed above.

Thus, the present disclosure provides an improved pressure reducer 100 that is simple in construction and easy to install. The pressure reducer 100 is advantageously designed in a manner such that the pressure compensation hole 114 is not directly exposed to an external environment. The pressure compensation hole 114 is enclosed or covered by the flange 132, which thereby provides protection to the pressure compensation hole 114 against the foreign elements present in the surroundings or the external environment of the pressure reducer 100. The flange 132 prevents clogging of the pressure compensation hole 114 due to dirt, sand, etc. The pressure compensation hole 114, thereby allows or ensures unobstructed mobility of the piston rod 121 and the diaphragm 128 in the pressure reducer chamber 120 and hence the efficient working of the pressure reducer 100.

In the drawings and specification, there have been disclosed preferred embodiments and examples of the invention and, although specific terms are employed, they are used in a generic and descriptive sense only and not for the purpose of limitation of the scope of the invention being set forth in the following claims.

LIST OF ELEMENTS

100 Pressure Reducer
110 Pressure Reducer Body
112 First Threaded Portion
114 Pressure Compensation Hole
120 Pressure Reducer Chamber
121 Piston Rod
122 Inlet Section
123 Threaded Portion
124 Outlet Section
125 Filter Element
126 Coupling Nipple
127 Threaded Portion
128 Sealing Element
129 Valve
130 Seal
131 Spring
132 Flange
133 Sealing Element
134 Second Threaded Portion
136 Third Threaded Portion
138 Connector/Nipple
140 Threaded Portion
X-X' Central Axis
Y-Y' Central Axis
Z-Z' Central Axis

The invention claimed is:

1. A pressure reducer for reducing a fluid pressure comprising:
    a pressure reducer body defining a pressure reducer chamber, the pressure reducer chamber including:
    an inlet section and an outlet section fluidly coupled with the inlet section such that the inlet section and the outlet section allow inlet and outlet of fluid respectively;
    a spring-operated piston rod; and
    a sealing element operatively coupled with the piston rod;
    a flange sealingly coupled with the pressure reducer body such that the sealing element disallows backflow of the fluid past the outlet section; and
    the pressure reducer body defining a pressure compensation hole;
    wherein the pressure reducer body has a first threaded portion, the flange has a second threaded portion complimentary to the first threaded portion such that the pressure reducer body and the flange are threadedly coupled to each other through the first and the second threaded portions; and
    wherein the pressure compensation hole is disposed in the first threaded portion of the pressure reducer body such that the flange is adapted to enclose the pressure compensation hole when the flange is coupled to the pressure reducer body and the pressure compensation hole is not directly exposed to an external environment.

2. The pressure reducer of claim 1, wherein the pressure compensation hole is a circular hole.

3. The pressure reducer of claim 1, wherein the pressure compensation hole is a channel extending at least partially along a length of the first threaded portion of the pressure reducer body.

4. The pressure reducer of claim 1, wherein the first and the second threaded portions between the pressure reducer body and the flange act as a filter body for the fluid drawn-in via the pressure compensation hole.

5. The pressure reducer of claim 1, wherein the sealing element seals the first and the second threaded portions between the flange and the pressure reducer body.

6. The pressure reducer of claim 1, wherein the sealing element is a diaphragm.

7. The pressure reducer of claim 1, wherein the pressure reducer generates a constant output pressure of 4 bars.

8. The pressure reducer of claim 1, wherein the pressure reducer generates a constant output pressure of 1.5 bars.

9. The pressure reducer of claim 1, wherein a valve selectively allows and disallows passage of the fluid via the inlet section.

10. The pressure reducer of claim 1, wherein the pressure reducer is used for drip-irrigation.

\* \* \* \* \*